(12) United States Patent
Ito

(10) Patent No.: US 8,042,415 B2
(45) Date of Patent: Oct. 25, 2011

(54) MOTION CONVERTING DRIVE MECHANISM AND VEHICLE SEAT APPARATUS INCLUDING THE SAME

(75) Inventor: Sadao Ito, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 151 days.

(21) Appl. No.: 12/368,543

(22) Filed: Feb. 10, 2009

(65) Prior Publication Data

US 2009/0236891 A1 Sep. 24, 2009

(30) Foreign Application Priority Data

Mar. 19, 2008 (JP) ................................. 2008-071957

(51) Int. Cl.
*F16H 3/06* (2006.01)
(52) U.S. Cl. .................. 74/89.23; 297/408; 74/89.34
(58) Field of Classification Search .................. 297/408, 297/362.11, 362.14; 74/89.34, 89.23, 89.24
See application file for complete search history.

(56) References Cited

U.S. PATENT DOCUMENTS

| | | | | |
|---|---|---|---|---|
| 528,211 A * | 10/1894 | Sedgwick | ...................... | 359/382 |
| 2,307,317 A * | 1/1943 | Konig | ............................ | 74/89.23 |
| 2,509,409 A * | 5/1950 | Amtsberg et al. | .............. | 318/466 |
| 2,927,473 A * | 3/1960 | Bentley | ........................... | 74/89.23 |
| 3,653,270 A * | 4/1972 | Bergstedt | ...................... | 74/89.23 |
| 4,225,148 A * | 9/1980 | Andersson | .............. | 280/124.146 |
| 4,304,439 A * | 12/1981 | Terada et al. | .................. | 297/409 |
| 4,640,549 A * | 2/1987 | Yokota | ........................... | 297/410 |
| 5,199,764 A * | 4/1993 | Robinson | .................. | 297/362.11 |
| 5,222,784 A * | 6/1993 | Hamelin | ........................ | 297/408 |
| 5,393,123 A * | 2/1995 | Hernandez et al. | ....... | 297/378.12 |
| 5,394,288 A * | 2/1995 | Nishida et al. | ................... | 361/31 |
| 5,542,744 A * | 8/1996 | Bathrick | .................... | 297/362.11 |
| 5,868,470 A * | 2/1999 | Hyder et al. | .............. | 297/362.14 |
| 5,967,580 A * | 10/1999 | Rosheim | .......................... | 294/88 |
| 6,055,877 A * | 5/2000 | Welterlin et al. | .............. | 248/429 |
| 6,158,808 A * | 12/2000 | Margolis et al. | .............. | 297/330 |
| 6,490,942 B1 * | 12/2002 | Meyer | ........................... | 74/89.37 |
| 6,511,130 B2 * | 1/2003 | Dinkel et al. | .................. | 297/410 |
| 6,826,793 B2 * | 12/2004 | Tekulve | ............................ | 5/618 |
| 7,444,894 B2 * | 11/2008 | Harper et al. | ................. | 74/89.23 |
| 7,520,564 B2 * | 4/2009 | Woerner | .................... | 297/216.12 |

(Continued)

FOREIGN PATENT DOCUMENTS

JP 6-11227 3/1994

(Continued)

*Primary Examiner* — Peter Brown
*Assistant Examiner* — David E Allred
(74) *Attorney, Agent, or Firm* — Oblon, Spivak, McClelland, Maier & Neustadt, L.L.P.

(57) ABSTRACT

A motion converting drive mechanism converting a rotary motion into a linear reciprocating motion includes a motor having an output shaft, a housing case to which the output shaft of the motor is fixed, a reduction gear mechanism including a first pinion and a second pinion meshing with the first pinion, and a screw mechanism having an internal threaded portion and an external threaded portion, one of which is integrally and coaxially formed with the second pinion. The first pinion serving as a helical gear wheel having two to four teeth is rotatably supported by the housing case therein. The first pinion has a rotation axis rotatably and coaxially connected to the output shaft of the motor. The second pinion having a rotation axis arranged in parallel and close to the rotation axis of the first pinion is rotatably supported by the housing case therein.

19 Claims, 9 Drawing Sheets

U.S. PATENT DOCUMENTS

| | | | |
|---|---|---|---|
| 7,530,633 B2 * | 5/2009 | Yokota et al. | 297/216.12 |
| 7,600,815 B2 * | 10/2009 | Corcoran | 297/339 |
| 7,845,729 B2 * | 12/2010 | Yamada et al. | 297/284.1 |
| 7,954,393 B2 * | 6/2011 | Harper et al. | 74/89.23 |
| 2003/0015046 A1 * | 1/2003 | Dzurko et al. | 74/89.23 |
| 2005/0183525 A1 * | 8/2005 | Blendea et al. | 74/89.23 |
| 2008/0006105 A1 * | 1/2008 | Ko | 74/89.23 |
| 2008/0007105 A1 * | 1/2008 | Viger | 297/408 |
| 2008/0168852 A1 * | 7/2008 | Chen et al. | 74/89.23 |
| 2008/0179932 A1 * | 7/2008 | Becker et al. | 297/367 |
| 2008/0295624 A1 * | 12/2008 | Oberle et al. | 74/89.34 |
| 2010/0102605 A1 * | 4/2010 | Yamada et al. | 297/284.3 |
| 2010/0236343 A1 * | 9/2010 | Chiang et al. | 74/89.34 |
| 2010/0242642 A1 * | 9/2010 | Ganter | 74/89.23 |
| 2011/0113955 A1 * | 5/2011 | Fukano et al. | 92/172 |

FOREIGN PATENT DOCUMENTS

| | | |
|---|---|---|
| JP | 6-71868 | 9/1994 |
| JP | 2005-28955 | 2/2005 |
| JP | 2009226982 A * | 10/2009 |

* cited by examiner

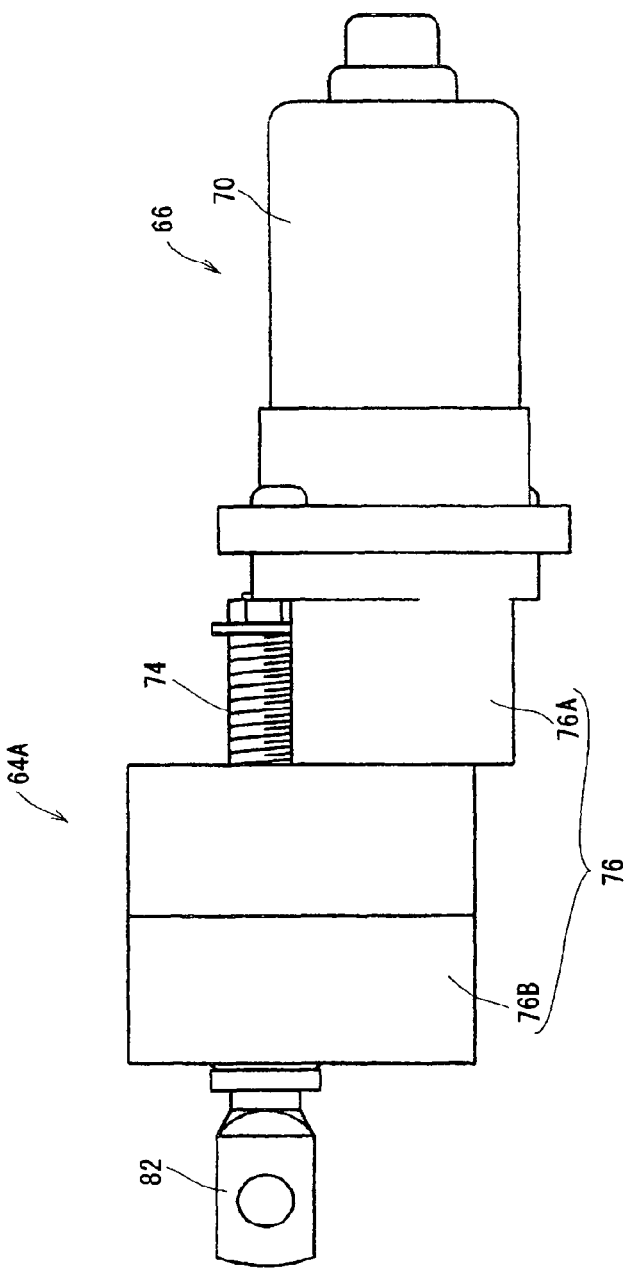
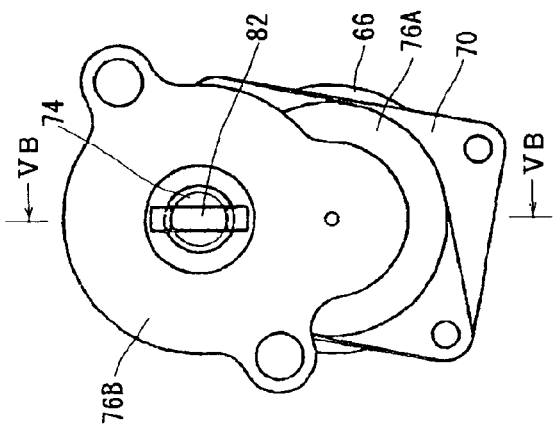

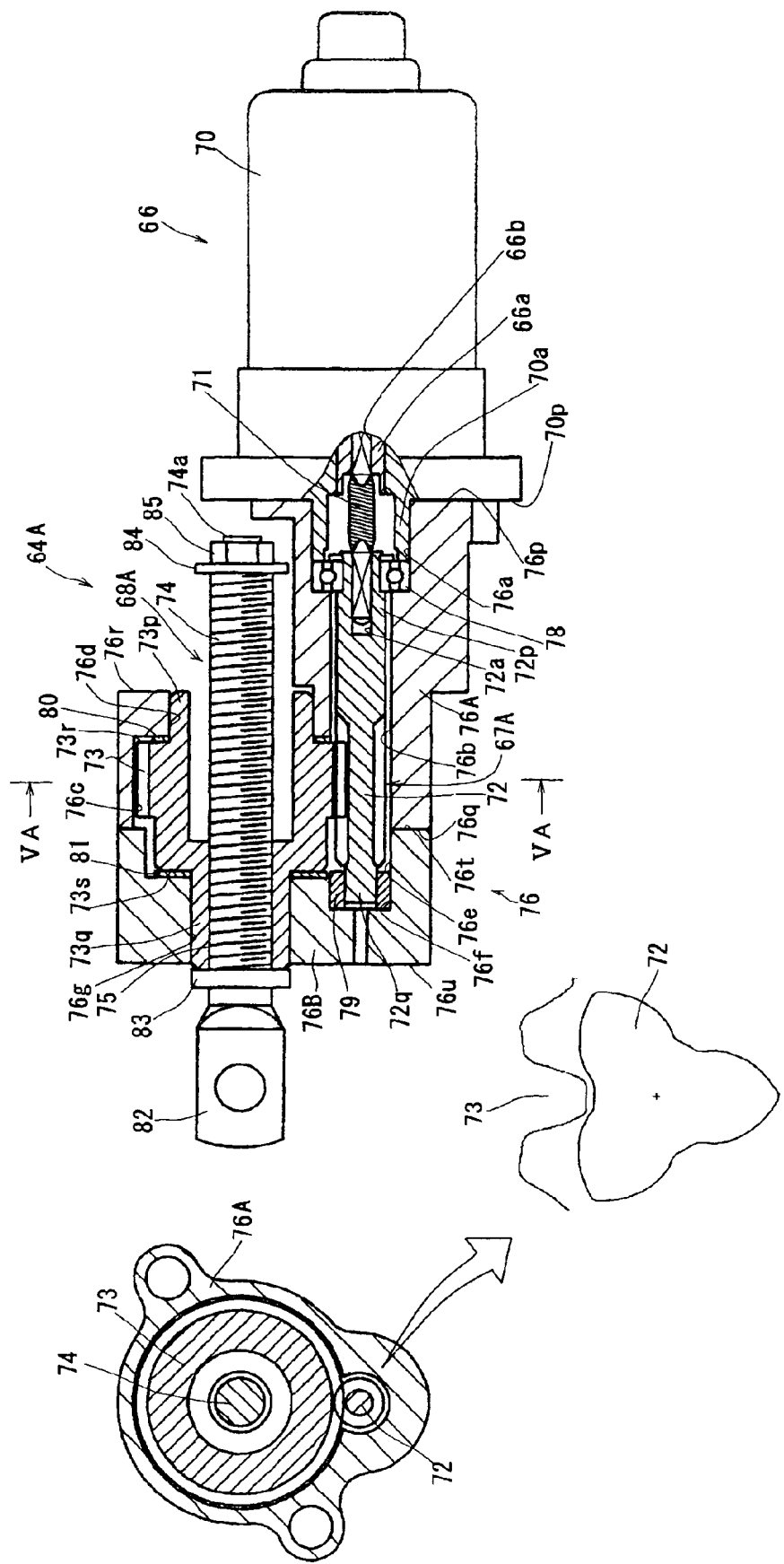

MOTION CONVERTING DRIVE MECHANISM AND VEHICLE SEAT APPARATUS INCLUDING THE SAME

CROSS REFERENCE TO RELATED APPLICATIONS

This application is based on and claims priority under 35 U.S.C. §119 to Japanese Patent Application 2008-071957, filed on Mar. 19, 2008, the entire content of which is incorporated herein by reference.

FIELD OF THE INVENTION

The present invention relates to a motion converting drive mechanism for converting a rotary motion of an output shaft of a motor into a linear reciprocating motion via a reduction gear mechanism and a screw mechanism so as to output the linear reciprocating motion, and pertains to a seat apparatus for a vehicle including a twofold seat back, an upper seat back portion of which is tilted forward and rearward back to a normal position (non-tilted position) by means of the motion converting drive mechanism.

BACKGROUND

In a conventional seat adjusting unit for a vehicle disclosed in JP6071868B (hereinafter referred to as Patent Document 1), one end of a drive shaft protruding from one end of a housing is connected to an output shaft of a motor. One end of a hub located at the outer side of the housing is joined to one end face of a spindle nut and the other end of the hub is located within the housing. A threaded spindle is fitted into the spindle nut so as to mesh therewith. The threaded spindle is connected to a seat, thereby being prevented from rotating. A worm wheel is formed at the other end of the hub. The worm wheel meshes with a worm arranged at the other end of the drive shaft. Such drive shaft is arranged so as to intersect with the hub so as to be perpendicular to a longitudinal axial line of the hub. According to the above configuration of the seat adjusting unit, when the motor is driven, the drive shaft and the worm gear integrally rotate with each other, thereby rotating the worm wheel and the spindle nut. Consequently, the threaded spindle axially moves, thereafter moving the seat in a longitudinal direction of the vehicle.

In a front vertical mechanism of a power seat for a vehicle described in JP2005028955A (hereinafter referred to as Patent Document 2), an axially unmovable nut member is provided in a gearbox so as to be rotatable therewithin. A worm wheel is formed around an outer circumference of the nut member. A worm provided on an output shaft of a motor meshes with the worm. A threaded bar is screwed with an inner circumferential surface of the nut member. One end of the threaded bar is attached to a link with a pin so as to be rotatable. Such threaded bar is arranged to intersect with the motor so as to be perpendicular thereto. According to the above configuration of the front vertical mechanism, when the motor is driven, the worm rotates, thereby rotating the worm wheel. Accordingly, the nut member rotates along with the rotation of the worm wheel, thereby axially moving the threaded bar. Thus, the link rotates and a front portion of a seat cushion is moved upward and downward while rotating about the pin.

In a seat lifter of a power unit adapted to be mounted on a seat for a vehicle, described in JP6011227Y (hereinafter referred to as Patent Document 3), a worm wheel and a first screw wheel are supported within a gearbox so as to rotate concentrically with each other. A second screw wheel is also supported within the gearbox. The second screw wheel is located perpendicular to the first screw wheel so as to mesh therewith. A worm provided on an output shaft of a motor meshes with the worm wheel. A screw shaft is axially attached to the second screw wheel. Nut blocks are screwed with the screw shaft. A lever and a link are connected to each of the nut blocks. Such screw shaft is arranged in parallel to the motor. According to the above configuration of the seat lifter, when the motor is driven, the worm rotates and the worm wheel integrally rotates with the first screw wheel, integrally rotating the second screw wheel with the screw shaft. Accordingly, the nut blocks axially move, thereby rotating the lever and tilting the link. Consequently, the seat lifter is moved upward and downward.

In the mechanism described in Patent Document 1, the motor and the threaded spindle are arranged in an L-shape or a T-shape. When such mechanism is arranged toward the center of a seat back from a lateral side of the seat back, for example, in order to apply the mechanism to an angle adjusting unit used for an upper seat back portion of the seat back, an occupant may contact the mechanism. Accordingly, the mechanism is required to be arranged at the lateral side of the seat back so as to extend along a rearward direction of the seat back in a longitudinal direction of the vehicle in order to prevent the occupant from contacting the mechanism. However, when the mechanism is arranged at the lateral side, the following issues may occur in designing the seat layout. In this case, the thickness of the seat back is increased, thereby resulting in a reduction of an internal space of the vehicle. Furthermore, in the mechanism described in Patent Document 2, the motor and the threaded bar are arranged in an L-shape or a T-shape. Accordingly, when the mechanism is applied to the angle adjusting unit used for the upper seat back portion, the above-mentioned issues may occur in the same way as described in Patent document 1. In the mechanism described in Patent Document 3, although the motor and the screw shaft are arranged in parallel to each other, a projected area of the mechanism seen from the axial direction is large. Accordingly, the above-mentioned issues may occur. In addition, the worm, the worm wheel, and a pair of the first and second screw wheels are required for the mechanism, so that the number of applied components increases, thereby resulting in cost increase.

A need thus exists for a motion converting drive mechanism and a seat apparatus for a vehicle including the motion converting drive mechanism, which are not susceptible to the drawback mentioned above.

SUMMARY OF THE INVENTION

According to an aspect of the present invention, a motion converting drive mechanism converting a rotary motion into a linear reciprocating motion, includes a motor having an output shaft, a housing case to which the output shaft of the motor is fixed, and a reduction gear mechanism including a first pinion and a second pinion meshing with the first pinion. The first pinion serving as a helical gear wheel having two to four teeth is rotatably supported by the housing case therein. The first pinion has a rotation axis roatably and coaxially connected to the output shaft of the motor. The second pinion having a rotation axis arranged in parallel and close to the rotation axis of the first pinion 72 is rotatably supported by the housing case therein. The motion converting drive mechanism further includes a screw mechanism having an internal threaded portion and an external threaded portion, one of which is integrally and coaxially formed with the second pinion.

BRIEF DESCRIPTION OF THE DRAWINGS

The foregoing and additional features and characteristics of the present invention will become more apparent from the following detailed description considered with reference to the accompanying figures, wherein:

FIG. 4A is a configuration diagram illustrating a motion converting drive mechanism according to the first embodiment of the present invention, seen from the direction of a rotation axis;

FIG. 4B illustrates a view of the motion converting drive mechanism seen from the direction perpendicular to the rotation axis of FIG. 4A;

FIG. 5A illustrates a cross-sectional view taken along line VA-VA of FIG. 5B and an enlarged view showing teeth shapes of first and second pinions;

FIG. 5B is a cross-sectional view taken along line VB-VB of FIG. 4A;

DETAILED DESCRIPTION

A first embodiment of a seat apparatus for a vehicle including a motion converting drive mechanism of the present invention will be explained with reference to the illustrations of the figures of FIGS. 1 to 3 as follows. In addition, "longitudinal, width, and vertical directions" described hereinafter are based on those directions in the vehicle.

Figure 1:
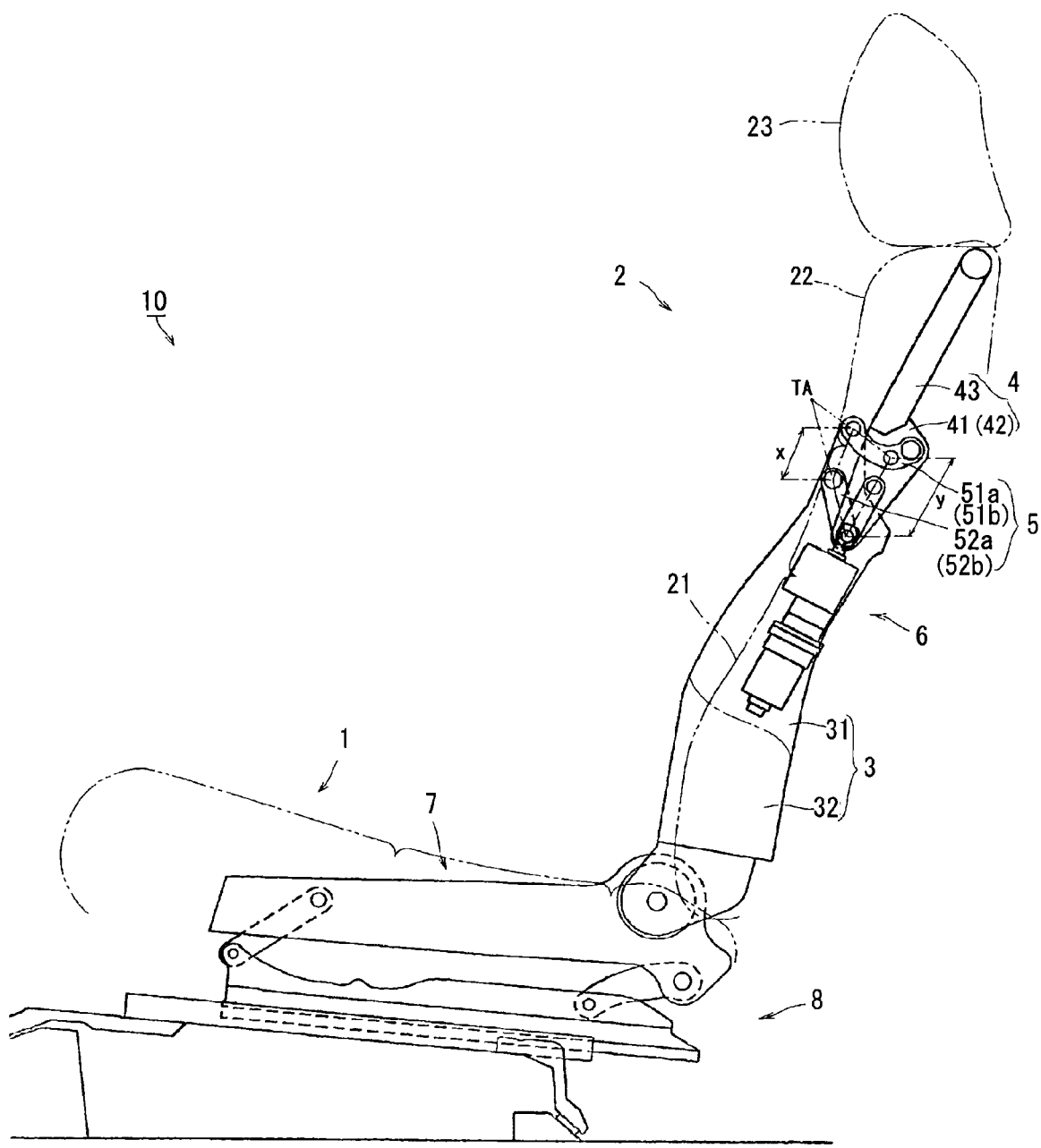
FIG. 1 is a schematic view illustrating the outline of a seat apparatus for a vehicle according to first and second embodiments of the present invention.

As illustrated in FIG. 1, a seat apparatus 10 for a vehicle includes a seat cushion 1 and a seat back 2. The seat cushion 1 is adapted to be fixed to a floor of the vehicle. The seat back 2 is supported at the lower end by the rear end of the seat cushion 1 so as to tilt forward and rearward in a longitudinal direction of the vehicle. The seat back 2 includes a lower seat back portion 21, an upper seat back portion 22, and a headrest 23. The lower seat back portion 21 is supported at the lower end by the rear end of the seat cushion 1 so as to tilt forward and rearward in the longitudinal direction, thereby connecting the whole seat back 2 to the seat cushion 1. The upper seat back portion 22 is supported at the lower end by the upper end of the lower seat back portion 21 so as to tilt forward and rearward thereat in the longitudinal direction. The headrest 23 is supported by the upper end of the upper seat back portion 22 so as to extend and retract in a vertical direction of the vehicle.

A seat back tilting mechanism 5 and a seat back tilting mechanism drive unit 6 are arranged between the lower seat back portion 21 and the upper seat back portion 22. As shown in FIG. 1 and FIG. 2, the seat back tilting mechanism 5 is a mechanism to tilt the upper seat back portion 22 forward and rearward relative to the lower seat back portion 21. The seat back tilting mechanism drive unit 6 serves to drive the seat back tilting mechanism 5 to tilt the upper seat back portion 22 forward and rearward relative to the lower seat back portion 21. That is, the seat back tilting mechanism 5 is driven by the seat back tilting mechanism drive unit 6, thereby rotating or moving the upper seat back portion 22 including the headrest 23 between the position shown in FIG. 1 and the position shown in FIG. 2.

Detailed explanations of each component of the seat apparatus 10 will be described as follows. As illustrated in FIG. 1 and FIG. 3, a side frame 3 is arranged within the lower seat back portion 21 of the seat back 2. An upper cross-member 4 is arranged within the upper seat back portion 22 so as to be located at an upper side of the side frame 3. The seat back tilting mechanism 5 that tilts the upper cross-member 4 relative to the side frame 3 is provided between the side frame 3 and the upper cross-member 4. The seat back tilting mechanism 5 is driven by the seat back tilting mechanism drive unit 6, thereby tilting the upper cross-member 4 relative to the side frame 3.

The side frame 3 includes side frame body portions 31 and 32 each forming a plate shape. The side frame body portions 31 and 32 are respectively arranged at both ends of the lower seat back portion 21 in a width direction of the vehicle so as to face each other. A lower end of each of the side frame body portions 31 and 32 is fixed to a reclining mechanism 8. The reclining mechanism 8 is supported by a rear end of a seat cushion frame 7 arranged within the seat cushion 1 so as to tilt forward and rearward.

The upper cross-member 4 includes upper cross-member body portions 41 and 42 and a pipe frame 43. The upper cross-member body portions 41 and 42 each forming a plate shape are respectively arranged at both ends of the upper seat back portion 22 in the width direction so as to face each other. The pipe frame 43 is provided so as to connect an end of the upper-cross-member body portion 41 and an end of the upper cross-member body portion 42. Holding portions 43a of a headrest holding mechanism are arranged at an upper portion of the pipe frame 43. The headrest holding mechanism holds the headrest 23 to extend and retract in the vertical direction.

The seatback tilting mechanism 5 includes two pairs of links 51a, 52a and links 51b, 52b cross-connecting the side frame body portion 31 and the upper cross-member body portion 41 and the side frame body portion 32 and the upper cross-member body portion 42, respectively, while forming a non-parallel four-link positioning the side frame 3 and the upper cross-member 4 to face each other. Under a condition where the upper cross-member 4 is not tilted, the links 51a and 52a extend approximately along the longitudinal direction. In addition, front ends of each of the links 51a, 52a are rotatably supported by the side frame body portion 31 while rear ends of each of the links 51a, 52a are rotatbly supported by the upper cross-member 41. The links 51b, 52b extend approximately along the longitudinal direction in the same way as the links 51a, 52a. In addition, front ends of each of the links 51b, 52b are rotatably supported by the side frame body portion 32 while rear ends of each of the links 51b, 52b are rotatbly supported by the upper cross-member 42. As shown in FIG. 3, the links 51a and 51b are integrally connected to a rod 61 so as to rotate therewith at positions that are located further forward than the respective pivotal attachment points of the rod 61 relative to the upper cross-members 41 and 42.

That is, upper ends of the side frame body portions 31 and 32 are respectively provided so as to be located at positions further forward than ends of each of the upper cross-member body portions 41 and 42. The links 51a and 51b are set at the same length and the links 52a and 52b are also set at the same length. The length of each of the links 52a and 52b is set so as to be slightly longer than the length of each of the links 51a and 51b. In addition, a distance defined between the front ends of each of the links 51a, 52a supported by the side frame body portion 31 is shorter than a distance defined between the rear ends of each of the links 51a, 52a supported by the upper cross-member body portions 41 while a distance defined between the front ends of each of the links 51b, 52b supported by the side frame body portion 32 is shorter than a distance defined between the rear ends of each of the links 51b, 52b supported by the upper cross-member body portions 42. Thus, the links 51a, 52a and the links 51b, 52b are moved so as to rotate counterclockwise in FIG. 1, thereby tilting the upper cross-member body portions 41 and 42 counterclockwise.

Movement of the seat back tilting mechanism 5 will be additionally explained with reference to FIG. 1 and FIG. 2 as follows. Firstly, as shown in FIG. 1, when the upper cross-member body portions 41 and 42 are not tilted forward and arranged in parallel to the side frame body portions 31 and 32, respectively, an inclination of each of the links 52a and 52b is greater than an inclination of each of the links 51a and 51b. This is referred from that a distance "x" defined between the front ends of each of the links 51a, 52a supported by the side frame body portion 31 and between the front ends of each of the links 51b, 52b supported by the side frame body portion 32 is shorter than a distance "y" defined between the rear ends of each of the links 51a, 52a supported by the upper cross-member body portion 41 and between the rear ends of each of the links 51b, 52b supported by the upper cross-member body portion 42. Furthermore, a fact that the length of each of the links 51a and 51b is shorter than the length of each of the links 52a and 52b is attributable to that the inclination of each of the links 52a and 52b is greater than the inclination of each of the links 51a and 51b.

Figure 2:
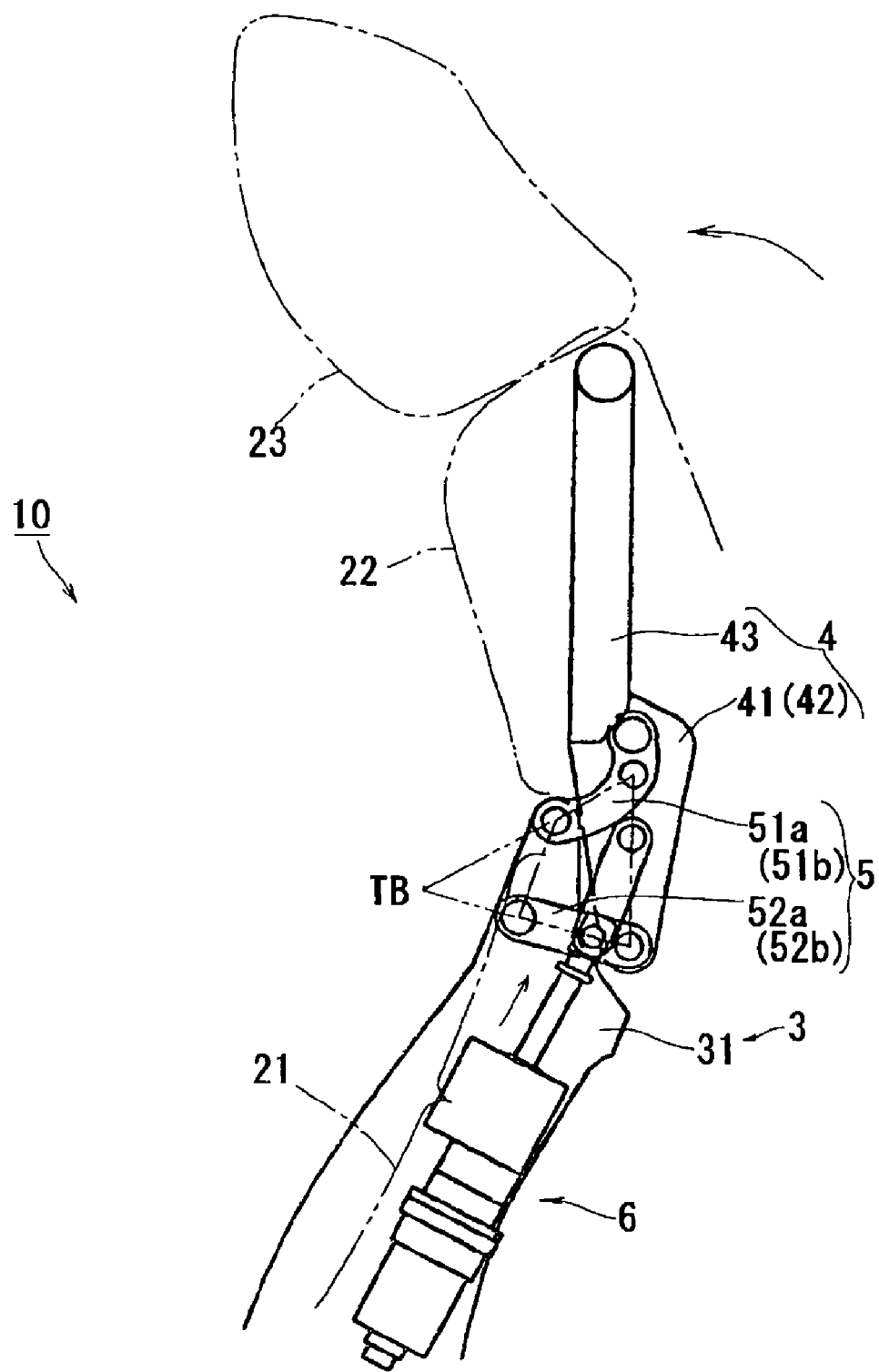
FIG. 2 is a schematic view illustrating a movement of the seat apparatus shown in FIG. 1.
Figure 3:
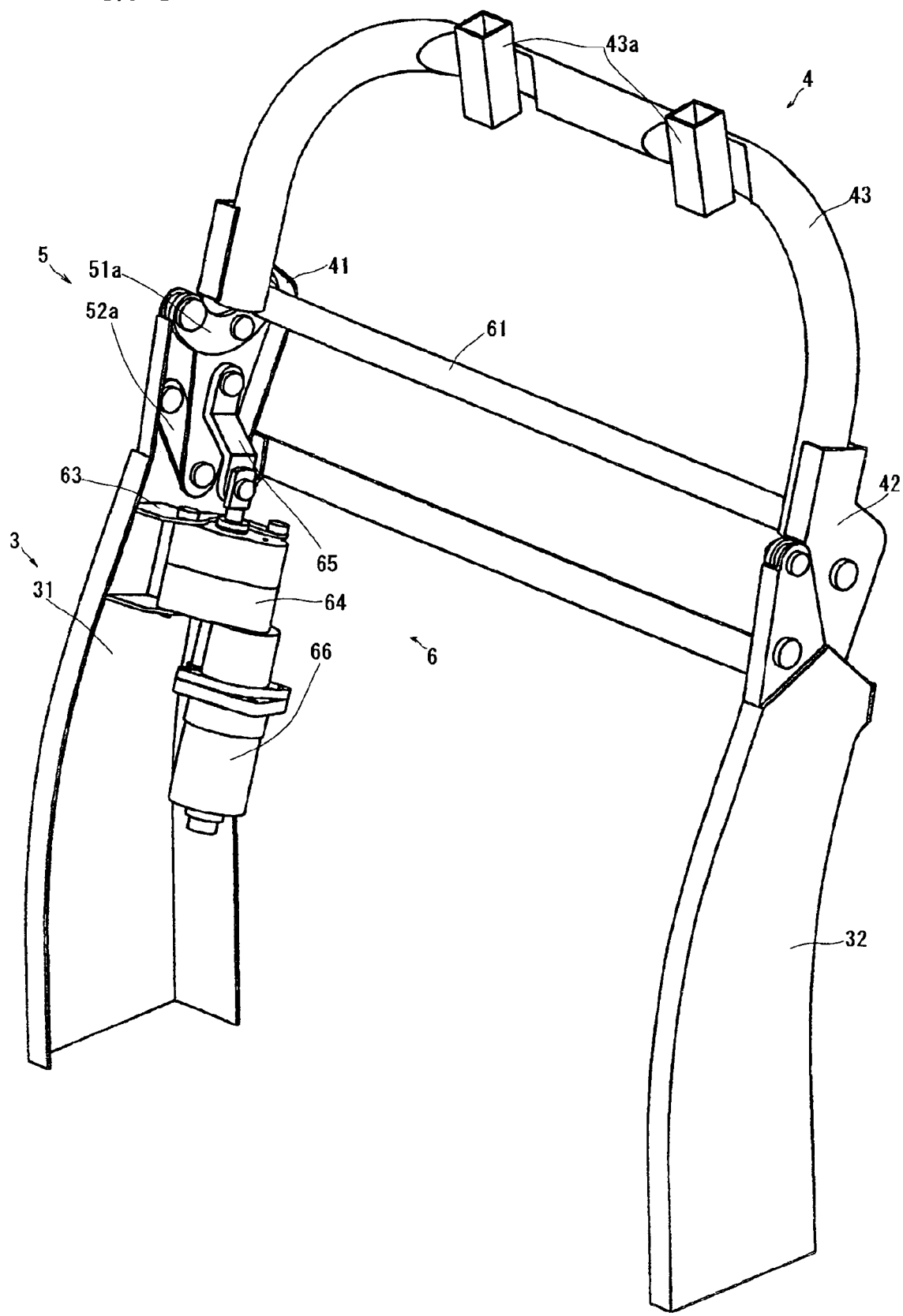
FIG. 3 is a perspective view illustrating components for a seat back of the seat apparatus shown in FIG. 1.

Secondly, when the links 51a and 51b are being moved so as to rotate counterclockwise (in the direction indicated by the arrow shown in FIG. 2), the links 52a and 52b gradually rotate counterclockwise (in the direction indicated by the arrow shown in FIG. 2). At this time, a rotation angle which the link 51a traces becomes relatively larger than a rotation angle which the link 52a traces. Thus, the upper cross-member body portions 41 (42) gradually rotates counterclockwise according to the counterclockwise rotation of the links 51a, 52a (51b, 52b) and reaches the position shown in FIG. 2. In this case, rotary center points when the upper cross-member body portions 41 and 42 are tilted forward, are located respectively at intersection points at which an extended line of the link 51a intersects with an extended line of the link 52a and an extended line of the link 51b intersects with an extended line of the link 52b. Each of the rotary center points is originally located at the position "TA" shown in FIG. 1 when the upper cross-member body portions 41 and 42 are not tilted forward. The rotary center point "TA" gradually moves to the position "TB" shown in FIG. 2 according to the counterclockwise rotation of the links 51a, 52a and the links 51b, 52b.

As is obviously seen in FIG. 1 and FIG. 2, a trajectory drawn according to the movement of the rotation center point from "TA" to "TB" is located at a position further forward than the position of each of the frame body portions 31 and 32. Moreover, each of "TA" and "TB" is also located further forward than an outer surface of the seat back 2 in the longitudinal direction. The rotary center points become closer to the respective side frame body portions 31 and 32 by shortening the distance "x" defined between the front ends of each of the links 51a, 52a supported by the side frame body portion 31 relative to the distance "y" defined between the rear ends of each of the links 51a, 52a supported by the upper cross-member body portion 41 and shortening the distance "x" defined between the front ends of each of the links 51b, 52b supported by the side frame body portion 32 relative to the distance "y" defined between the rear ends of each of the links 51b, 52b supported by the upper cross-member body portion 42. Furthermore, when the shorter the length of each of the links 51a and 51b is relative to the length of each of the links 52a and 52b, the larger a travel distance of the rotation center from "TA" to TB becomes.

The seat back tilting mechanism drive unit 6 serves to rotate the upper cross-member body portions 41 and 42 by driving the seat back tilting mechanism 5, thereby rotating the upper cross-member 4. The seat back tilting mechanism drive unit 6 includes a motion converting drive mechanism 64 and a travel link 65. The motion converting drive mechanism 64 is fixed to the side frame body portion 31 via a holding bracket 63. The motion converting drive mechanism 64 includes a motor 66 and a motor shaft (an output shaft) 66a shown in FIG. 5 and FIG. 8. The motion converting drive mechanism 64 converts a rotary motion of the motor shaft 66a of the motor 66 into a linear reciprocating motion in the vertical direction so as to output the linear reciprocating motion. The travel link 65 is rotatably supported at the first end by the upper cross-member body portion 41 and connected at the second end to an output member (a lead screw 74 shown in FIG. 4 and FIG. 5B, a lead nut 93 shown in FIG. 7) of the motion converting drive mechanism 64, thereby reciprocally and linearly moving in an axial direction of the output member.

Figure 6:
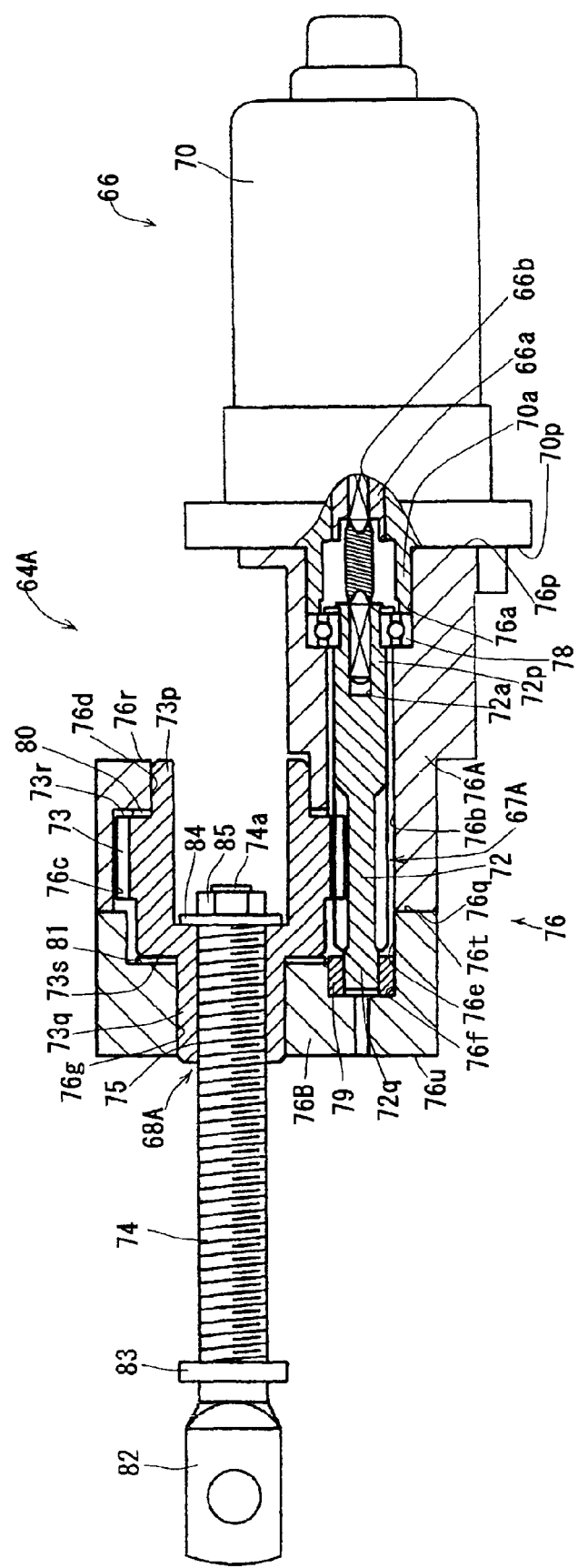
FIG. 6 is a cross-sectional view illustrating a condition of the motion converting drive mechanism when moved toward the left direction from the position shown in FIG. 5B.

A configuration according to a first embodiment of such motion converting drive mechanism 64 will be described with reference to FIGS. 4 to 6 as follows. As shown in FIG. 4B and FIG. 5B, a motion converting drive mechanism 64A according to the first embodiment includes a housing case 76 including a base portion 76A and a supporting portion 76B, the motor 66, a reduction gear mechanism 67A, and a screw mechanism 68A. A motor housing 70 of the motor 66 is fixed to the base portion 76A of the housing case 76 at a left end face 70p of the motor housing 70, which faces the direction to which the motor shaft 66a extends, as seen in FIG. 5B. Accordingly, the motor 66 is arranged near the side frame body portion 31 with the motor shaft 66a being kept upward as shown in FIG. 3, so that the motion converting drive mechanism 64A is fixed to an inner side of the side frame in parallel thereto. The motor 66 is driven and controlled by a motor drive unit that is operated according to an operation of an operating switch pressed by an occupant. Consequently, the motor drive unit commands the motor 66 to rotate into both positive and negative directions.

The reduction gear mechanism 67A includes a first pinion 72 and a second pinion 73 meshing with the first pinion 72. The screw mechanism 68A includes the lead screw 74 to which an external threaded portion is formed and a lead nut 75 to which an internal threaded portion is formed. The external threaded portion of the lead screw 74 meshes with the internal threaded portion of the lead nut 75. The lead screw 74 and the lead nut 75 are accommodated in the housing case 76. A connecting projection 70a provided at the left end face 70p of the motor housing 70 is inserted into the base portion 76A of the housing case 76 and located within a connecting hole 76a formed in a right end face 76p of the base portion 76A as seen in FIG. 5B. The motor housing 70 is fixed to the housing case 76 with a screw in 25 a condition where the right end face 76p of the base portion 76A and the left end face 70p of the motor housing 70 are in contact with each other. The housing case 76 includes the base portion 76A and the supporting portion 76B. As shown in FIG. 5B, the base portion 76A and the supporting portion 76B are fixed to each other with a screw so as to be integrated with each other in a condition where a right end face 76t of the supporting portion 76B and a left end face 76q of the base portion 76A are in contact with each other.

The first pinion 72 is a helical gear wheel composed of two to four helical gear teeth. As shown in an enlarged view in FIG. 5A, a helical gear wheel composed of three helical gear teeth each having a spiral angle of 45 degrees is applied as an example of the first pinion 72 of the first embodiment. Applying the helical gear wheel having the three helical gear teeth is the most appropriate for size and weight reduction. The first pinion 72 includes a projected end portion 72p projecting toward the right direction seen in FIG. 5B. A connecting hole 72a is formed in the projected end portion 72p. A flexible connecting shaft 71 includes one end fitted into the connecting hole 72a and the other end fitted into a rectangular-shaped hole 66b formed in an end face of the motor shaft 66a of the motor 66. Accordingly, a rotation axis of the first pinion 72 and the motor shaft 66a are arranged linearly to each other.

The first pinion 72 is inserted from the direction of the projected end portion 72p so as to be accommodated within an accommodating hole 76b penetrating from the left end face 76q of the base portion 76A to a bottom face of the connecting hole 76a of the base portion 76A. An outer circumferential surface of the projected end portion 72p is inserted into an inner circumferential space of a shaft bearing 78 so to be retained therewithin. The shaft bearing 78 is fitted into the connecting hole 76a of the base portion 76A. The first pinion 72 includes a projected end portion 72q extending toward the left direction seen in FIG. 5B. The projected end portion 72q is inserted into an accommodating hole 76e formed in the right end face 76t of the supporting portion 76B. An outer circumferential surface of the projected end portion 72q is fitted into an inner circumferential space of a bearing bush 79. The bearing bush 79 is fitted into an attaching hole 76f formed in a bottom face of the accommodating hole 76e of the supporting portion 76B. Accordingly, the first pinion 72 synchronously rotates with the rotation of the motor shaft 66a of the motor 66.

The second pinion 73 is a helical gear wheel meshing with the first pinion 72. The helical gear wheel is composed of twenty-four helical gear teeth and is applied as an example in the first embodiment. A rotation axis of the second pinion 73 and the rotation axis of the first pinion 72 are arranged in parallel to each other. In addition, when the first pinion 72 composed of four helical gear teeth is applied, the second pinion 73 composed of thirty-two helical gear teeth is applied.

The second pinion 73 includes a projected end portion 73p projecting toward the right direction seen in FIG. 5B and a projected end portion 73q projecting toward the left direction that is opposite direction from the projected end portion 73p. The projected end portion 73p is inserted into an accommodating hole 76c formed in the left end face 76q of the base portion 76A. An outer circumferential surface of the projected end portion 73p is fitted into a bearing hole 76d penetrating from a right end face 76r of the base portion 76A, seen in FIG. 5B, to a bottom face of the accommodating hole 76c. Accordingly, the projected end portion 73p is rotatably supported in the bearing hole 76d. In addition, a thrust washer 80 is inserted between the bottom face of the accommodating hole 76c and an intermediate end face 73r of the second pinion 73. The projected end portion 73q of the second pinion 73 is inserted into the accommodating hole 76e of the supporting portion 76B. An outer circumferential surface of the projected end portion 73q is fitted into a bearing hole 76g penetrating from a left end face 76u of the supporting portion 76B, seen in FIG. 5B, to the bottom face of the accommodating hole 76e. Accordingly, the projected end portion 73q is rotatably supported in the bearing hole 76g. In addition, a thrust washer 81 is inserted between a left end face 73s of the second pinion 73, seen in FIG. 5B, and the bottom face of the accommodating hole 76e. Thus, the second pinion 73 is axially supported by the thrust washers 80 and 81, thereby synchronously rotating with the rotation of the first pinion 72.

A link-connecting portion 82 is arranged at a left end of the lead screw 74 so as to protrude therefrom toward the left direction seen in FIG. 5B. The second end of the travel link 65 is fastened with a pin to the link-connecting portion 82. In addition, a first flanged stop member 83 is formed at a right end of the lead screw 74, seen in FIG. 5B. A threaded portion 74a is arranged at the right end of the lead screw 74. The threaded portion 74a has a diameter smaller than a diameter of the lead screw 74. The threaded portion 74a is inserted in a second ring-shaped stop member 84. The second stop member 84 is cramped with a nut 85 so as to be fixed to the threaded portion 74a.

The lead nut 75 is formed on an inner circumferential surface of the projected end portion 73q of the second pinion 73. That is the lead nut 75 is integrally formed within the second pinion 73. In addition, the lead screw 74 is inserted into the lead nut 75 so as to mesh therewith. A shaft of the lead screw 74 and the rotation axis of the second pinion 73 are arranged linearly to each other. The rotation axis of the first pinion 72 is arranged in parallel to the shaft of the lead screw 74 and the rotation axis of the second pinion 73. Accordingly, the lead nut 75 integrally rotates with the second pinion 73, so that the lead screw 74 linearly and axially reciprocates in a space defined between the first stopper 83 and the second stopper 84 in synchronization with the rotation of the lead nut 75 as shown in FIG. 5B and FIG. 6. A rotation range of the seatback tilting mechanism 5 is limited by controlling the linear and axial movement of the lead screw 74. Consequently, a tilting range of the upper seat back portion 22 is selectively set.

According to the motion converting drive mechanism 64A configured as described above, a distance between the rotation axis of the first pinion 72 composed of a small number of helical gear teeth and the rotation axis of the second pinion 73 is reduced, compared to a distance between a rotation axis of a conventional worm and a rotation axis of a conventional worm wheel. Accordingly, the motor shaft 66a of the motor 66 connected to the lead screw 74 via the first pinion 72 is arranged in parallel and closer to the lead screw 74. In particular, as shown in FIG. 4A, the motor shaft 66a of the motor 66 and the lead screw 74 are arranged in parallel and close to each other in such a way that a projected area of the lead screw 74 is included in a projected area of the motor housing 70 of the motor 66 that is seen from an axial direction of the motor shaft 66a. In this case, as shown in FIG. 5B, when the lead screw 74 is limited from moving by the first stop portion 83, the length of the lead screw 74 is established in such a way that an end of the threaded portion 74a of the lead screw 74 does not contact the left end face 70p of the motor housing 70. Accordingly, the compact motion converting drive mechanism 64A surely converting a rotary motion of the motor 66 to a linear motion and transmitting the linear motion is realized.

As described above, the motor 66, the reduction gear mechanism 67A, and the screw mechanism 68A are arranged in an approximate I-shape. A projected area of the motion converting drive mechanism 64A seen from the axial direction of the motor shaft 66a is reduced, compared to the case where the worm and the worm wheel are applied. That is, the projected area of the motion converting drive mechanism 64A is established so as to be an approximate cross-sectional area of the motor housing 70. Accordingly, a compact and simple configuration of the motion converting drive mechanism 64A is obtained, thereby increasing its installability to the seat apparatus 10. Moreover, since the helical gear wheel composed of a small number of helical gear teeth is applied in the first embodiment, a large gear ratio between the first pinion 72 and the second pinion 73 is obtained, thereby realizing a large reduction gear ratio equal to a reduction gear ratio between the worm and the worm wheel. In addition, the motion converting drive mechanism 64A is composed of a small number of components such as the first pinion 72, the second pinion 73, the lead screw 74, the lead nut 75, and the motor 66, thereby minimizing costs.

Figure 7:
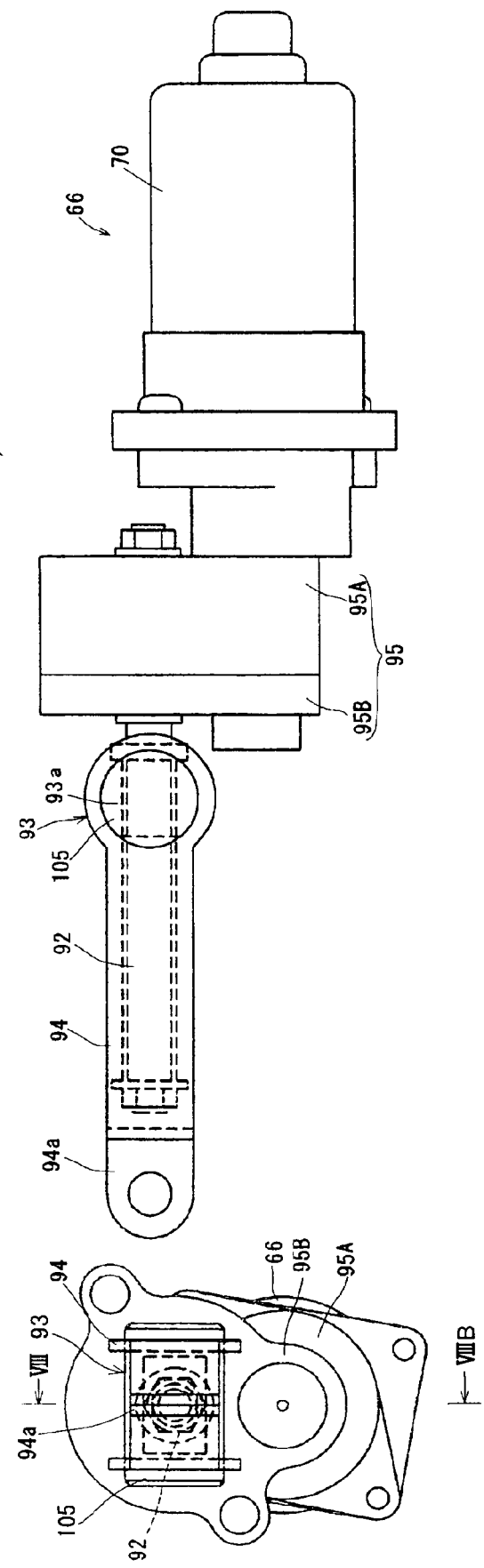
FIG. 7A illustrates a configuration diagram of a motion converting drive mechanism according to the second embodiment of the present invention, seen from the direction of a rotation axis.
FIG. 7B is a view of the motion converting drive mechanism seen from the direction perpendicular to the rotation axis of FIG. 7A.
Figure 8:
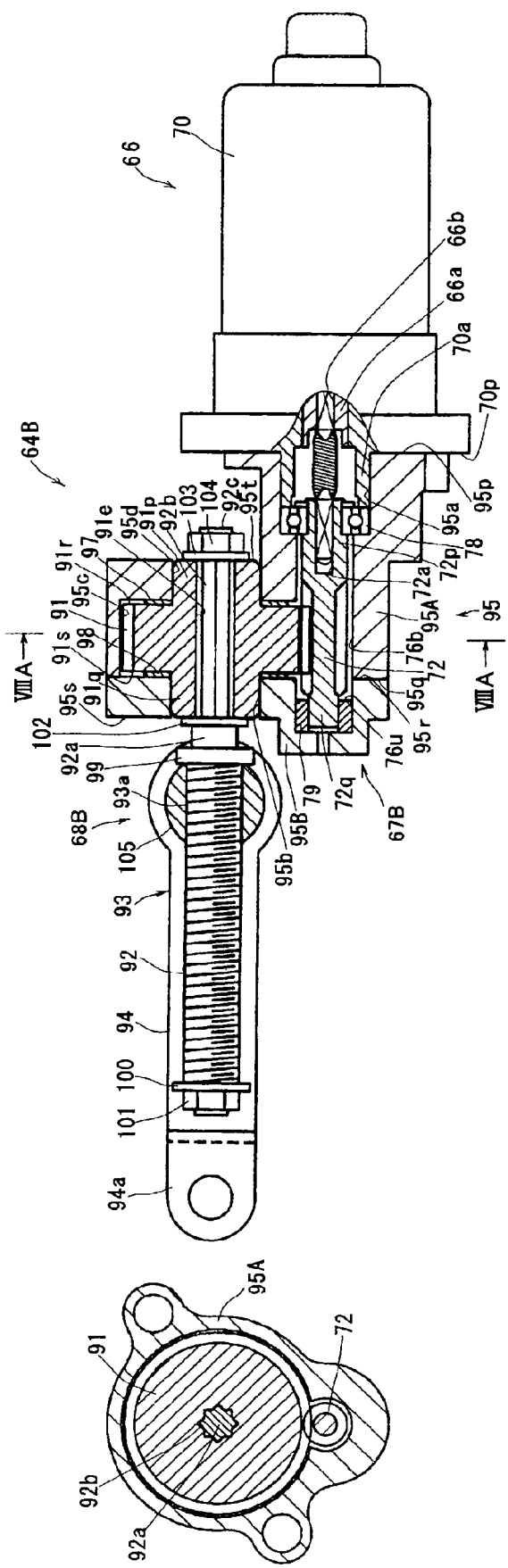
FIG. 8A is a cross-sectional view taken along VIIIA-VIIIA of FIG. 8B.
FIG. 8B is a cross-sectional view taken along line VIIIB-VIIIB of FIG. 7A.
Figure 9:
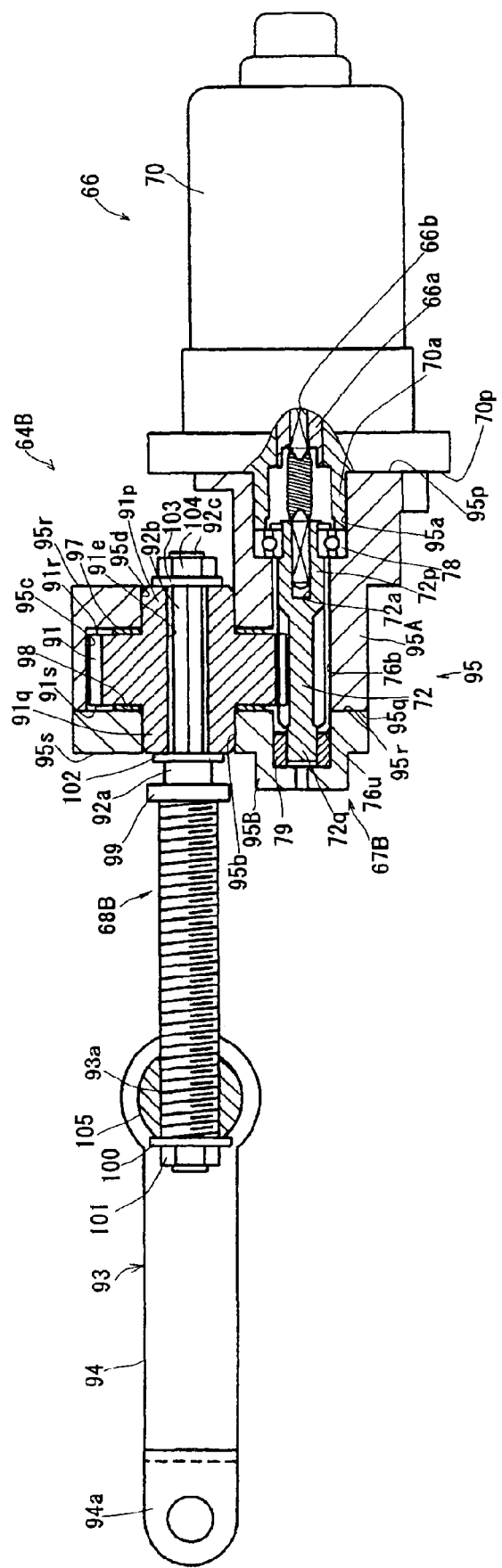
FIG. 9 is a cross-sectional view illustrating a condition of the motion converting drive mechanism that is moved toward the left direction from the position shown in FIG. 8B.

Next, a configuration according to a second embodiment of the motion converting drive mechanism 64 will be described with reference to FIGS. 7 to 9 as follows. A motion converting drive mechanism 64B according to the second embodiment is different from the motion converting drive mechanism 64A of the first embodiment in that a reduction gear mechanism 67B and a screw mechanism 68B are partially different from the reduction gear mechanism 67A and the screw mechanism 68A. A configuration of the motion converting drive mechanism 64B similar to the motion converting drive mechanism 64A will be described by assigning the same numbers and omitting the detailed explanation.

The reduction gear mechanism 67B includes the first pinion 72 and a second pinion 91 meshing with the first pinion 72. The screw mechanism 68B includes a lead screw 92 on which an external threaded portion is formed and a lead nut 93 meshing with the lead screw 92. The reduction gear mechanism 67B and the screw mechanism 68B are supported by a housing case 95 so as to be accommodated therein. The housing case 95 includes a base portion 95A and a supporting portion 95B. A connecting hole 95a is formed in a right end face 95p seen in FIG. 8B. The connecting projection 70a provided at the left end face 70p of the motor housing 70 is fitted into the connecting hole 95a. Accordingly, the base portion 95A is connected to the left end face 70p of the motor housing 70 with a screw. The supporting portion 95B is fixed to a left end face 95q of the base portion 95A seen in FIG. 8B. As shown in FIG. 8B, the supporting portion 95B is fixed to the base portion 95A with a screw in a condition where a right end face 95r of the supporting portion 95B, seen in FIG. 8B, is in contact with the left end face 95q of the supporting portion 95A.

Explanations of a configuration and how to attach the first pinion 72 to the motion converting drive mechanism 64B are omitted because the same configuration and attaching method are applied in the motion converting drive mechanism 64A of the first embodiment. The second pinion 91 is a helical gear wheel meshing with the first pinion 72 having the three helical gear teeth. The second pinion 91 having twenty-four helical gear teeth is applied as an example in the second embodiment. A rotation axis of the second pinion 91 and the rotation axis of the first pinion 72 are arranged in parallel to each other.

The second pinion 91 includes a projected end portion 91p projecting toward the right direction and a projected end portion 91q projecting toward the opposite direction from the projected end portion 91p as seen in FIG. 8B. The projected end portion 91p is inserted into an accommodating hole 95c formed in the left end face 95q of the base portion 95A. An outer circumferential surface of the projected end portion 91p is fitted into a bearing hole 95d penetrating from an intermediate end face 95t of the base portion 95A to a bottom face of the accommodating hole 95c. Accordingly, the projected end portion 91p is rotatably supported in the bearing hole 95d. In addition, a thrust washer 97 is inserted between the bottom face of the accommodating hole 95c and a right end face 91r of the second pinion 91 seen in FIG. 8B. An outer circumferential surface of the projected end portion 91q is fitted into a bearing hole 95b penetrating from the right end face 95r of the supporting portion 95B to a left end face 95s of the supporting portion 95B. Accordingly, the projected end portion 91q is rotatably supported in the bearing hole 95b. In addition, a thrust washer 98 is inserted between the right end face 95r of the supporting portion 95B and a left end face 91s of the second pinion 91 seen in FIG. 8B. Accordingly, the second pinion 91 synchronously rotates with the rotation of the first pinion 72. A serrated hole 91e is perforated circumferentially around the rotation axis of the second pinion 91. A serrated shaft 92b formed on a shaft portion 92a of a lead screw 92 described below is inserted in the serrated hole 91e. In addition, a shaft and a hole each having a cross section forming a polygonal shape, a half-moon shape, or a double chamfered shape may be applied instead of the serrated shaft 92b and the serrated hole 91e.

The shaft portion 92a having a diameter smaller than a diameter of the lead screw 92 is provided at a right end of the lead screw 92, seen in FIG. 8B. A ring-shaped stop member 99 is formed between a threaded portion of the lead screw 92 and the shaft portion 92a. A ring-shaped stop member 100 is provided at a left end of the lead screw 92. A left end of the threaded portion of the lead screw 92 is inserted in the stop member 100. The stop member 100 is fastened to the left end of the threaded portion of the lead screw 92 with a nut 101. A washer 102 is attached to a left end of the shaft portion 92a so as to be in contact therewith. The serrated shaft 92b is inserted into the serrated hole 91e of the second pinion 91. A washer 103 is inserted in a threaded portion 92c formed at a right end of the shaft portion 92a so as to be fixed thereto with a nut 104.

The lead nut 93 includes an internal thread 93a meshing with the external threaded portion of the lead screw 92, an output link 94, and a link-connecting portion 94a formed at the left end of the output link 94. The output link 94 extends along an axial direction of the internal threaded portion 93a toward the left direction seen in FIG. 8B and has a cylindrical portion 105 at the right end. The cylindrical portion 105 of the output link 94 is formed so as to have an axial centerline, which is perpendicular to the axis of the internal thread portion 93a. In addition, the output link 94 has a two-forked end extending in the axial direction of the internal thread portion 93a. The two-forked end of the output link 94 is fixed to the cylindrical portion 105. The internal thread portion 93a is formed so as to penetrate through a circumferential surface of the cylindrical portion 105 in the axial direction of the internal thread portion 93a. The second end of the travel link 65 is connected to the link-connecting portion 94a with a pin. Further, the lead screw 92 is fitted into the lead nut 93 so as to mesh therewith. The lead nut 93, a shaft of the lead screw 92, and the rotation axis of the second pinion 91 are arranged linearly to one another and positioned in parallel to the first pinion 72. Accordingly, the lead screw 92 integrally rotates with the second pinion 91, so that the lead nut 93 axially and linearly reciprocates in a space defined between the stop member 99 and stop member 100 in synchronization with the rotation of the lead screw 92 as shown in FIG. 8B and FIG. 9. A rotation range of the seatback tilting mechanism 5 is limited by controlling the linear and axial movement of the lead nut 93, so that a tilting range of the upper seat back portion 22 is selectively set.

According to the motion converting drive mechanism 64B configured as described above, the length of the lead screw 92 is enlarged without increasing the size of the housing case 95. This is especially effective when it is required to increase a movable range of the lead screw 92. In addition, a distance between the rotation axis of the first pinion 72 that is the helical gear wheel having a small number of helical gear teeth and the rotation axis of the second pinion 91 is reduced, compared to the distance between the rotation axis of the conventional worm and the rotation axis of the conventional worm wheel. Accordingly, the motor shaft 66a of the motor 66 connected to the lead screw 92 via the first pinion 72 is arranged in parallel and closer to the lead nut 93 meshing with the lead screw 92. In particular, as shown in FIG. 7A, the motor shaft 66a of the motor 66 and the lead nut 93 meshing with the lead screw 92 are arranged in parallel and close to each other in such a way that an approximate whole projected area of the lead screw 92 and the lead nut 93 is included in the projected area of the motor housing 70 of the motor 66 that is seen from the axial direction of the motor shaft 66a.

As described above, the motor 66, the reduction gear mechanism 67B, and the screw mechanism 68B are arranged in an approximate I-shape. A projected area of the motion converting drive mechanism 64B seen from the axial direction of the motor shaft 66a is reduced, compared to the case where the worm and the worm gear are applied. That is, the projected area of the motion converting drive mechanism 64B is established so as to be the approximate cross-sectional area of the motor housing 70. Accordingly, a compact and simple configuration of the motion converting drive mechanism 64B is obtained, thereby increasing its installability to the seat apparatus 10. Moreover, since the helical gear wheel composed of a small number of helical gear teeth is applied in the second embodiment, a large gear ratio between the first pinion 72 and the second pinion 91 is obtained, thereby realizing a large reduction gear ratio equal to the reduction gear ratio between the worm and the worm wheel. In addition, the motion converting drive mechanism 64B is composed of a small number of components such as the first pinion 72, the second pinion 91, the lead screw 92, the lead nut 93, and the motor 66, thereby minimizing costs.

Operation of the seat apparatus 10 configured as described above will be explained below. When an occupant pressed the operating switch in order to tilt the upper cross-member 22 of the seat back 2 forward, the motor drive unit commands the motor 66 to rotate in a predetermined direction. Accordingly, the first pinion 72 of the motion converting drive mechanism 64A or the motion converting drive mechanism 64B rotates in accordance with a rotational output from the motor 66. Consequently, the second pinion 73 or the second pinion 91 meshing with the first pinion 71 also rotates in a predetermined direction in accordance with the rotation of the first pinion 72. Rotation of the lead screw 74 or the lead nut 93 is limited around the rotation axis, thereby moving in the axial (vertical) direction in accordance with the rotation of the second pinion 73 or 91. Thus, the second pinion 73 or 91 moves the upper seat cross-member body portion 41 upward via the travel link 65. As a result, while being moved upward, the upper cross-member body portion 41 is tilted forward (in the counterclockwise direction seen in FIG. 2) by the seat back tilting mechanism 5.

The upper cross-member 4 including the upper cross-member portion 41 is tilted forward according to the upward movement of the upper cross-member 4 in the vertical direction and by an action of a non-parallel four-link mechanism (the seat back tilting mechanism 5) formed by the link 51a, the link 52a, the side frame body portion 31, and the upper cross-member body 41. Here, the upper cross-member body portion 42 rotates along with the rotation of the upper cross-member body portion 41 via the rod 61 serving as a rotation transmitting shaft, thereby tilting forward while drawing the same trajectory as the upper cross-member body portion 41.

The seat back upper portion 22 is moved from the position indicated by double dashed-lines in FIG. 1 to the position indicated by double dashed-lines in FIG. 2 according to the tilting movement of the upper cross-member 4. In this case, the back of an occupant is pushed by the outer surface of the seat back 2, so that the back of the occupant is arched and the upper body of the occupant is moved forward. Under this condition, a rotation center of the forward tilting movement of the upper seat back portion 22 is located further forward than the outer surface of the seat back 2 in the longitudinal direction and at a position near a portion where the spinal column of the occupant is arched. Accordingly, when the back of the occupant pushed by the upper seat back portion 22 is arched, the outer surface of the seat back 2 is moved along the movement of the back of the occupant. Consequently, displacement occurring between the back of the occupant and the outer surface of the seat back 2 is reduced. That is, the surface of the back of the occupant is assumed to rotate about a rotation axis which is defined within the spinal column because the back of the occupant is located further forward than the outer surface of the seat back 2 in the longitudinal direction. Thus, the upper seat back portion 22 is configured to rotate and tilt forward about the rotation axis defined within the spinal column of the occupant.

When the rotation center of the forward tilting movement of the upper seat back portion 22 is only slightly apart from the outer surface of the seat back 2, the occupant may experience discomfort when the seat back 2 tilt amount is sufficiently reduced. For example, a distance between the outer surface of the seat back 2 and the rotation center of the forward tilting movement of the upper seat back portion 22 may be set at 20 centimeters or less, 15 centimeters or less, or 10 centimeters or less so as to be located further forward than the outer surface of the seat back 2 in the longitudinal direction. Especially, it is appropriate that the rotation center of the forward tilting movement of the upper seat back portion 22 is set at a position near a rotation center of the forward tilting movement occurring when an occupant leans forward. Further, it is appropriate for a rotation center of the upper seat back portion 22 in the vertical direction to be set at a position located near the rotation center of the occupant leaning forward. For example, the rotation center of the forward tilting movement of the upper seat back portion 22 is set at a position further forward than a rotation center of the chest or abdominal of the occupant leaning forward. In this way, the rotation center of the forward tilting movement of the upper seat back portion 22 is located further forward than the outer surface of the seat back 2 by means of the seat back tilting mechanism 5. On the other hand, when the occupant wants to tilt the upper seat back portion 22 back to a normal position, he or she pushes the operating switch in order to create a condition where the upper seat back portion 22 is not tilted forward relative to the lower seat back portion 21, thereby rotating the motor 66 in an inverse direction. Accordingly, the seat back tilting mechanism 5 operates in the opposite direction from the above-mentioned forward tilting movement of the upper seat back portion 22, thereby tilting the upper seat back portion 22 rearward to the normal position.

In addition, the motion converting drive mechanism 64 is applied to the seat back tilting mechanism drive unit 6 tilting the upper seat back portion 22 relative to the lower seat back portion 21 in the embodiments described above. However, a location to which the motion converting drive mechanism 64 is applied is not limited to the seat back tilting mechanism drive unit 6. For example, the motion converting drive mechanism 64 may be applied to the reclining mechanism 8 arranged within the seat cushion 1 of the seat apparatus 10, a front side or a rear side of the seat cushion 1, a seat sliding mechanism for sliding the seat cushion 1 in the longitudinal and vertical directions, a seat cushion adjusting mechanism for adjusting the length of the seat cushion 1, and an ottoman mechanism. Furthermore, a location to which the motion converting drive mechanism 64 is applied is not limited to the seat apparatus 10 but may be applied to a tilt adjusting mechanism and a lock mechanism for a steering apparatus.

As described above, the motor shaft 66a of the motor 66 and the screw mechanism 68A, 68B are connected to each other via the gear reduction mechanism 67A, 67B including the first pinion 72 composed of the helical gear wheel with two to four helical gear teeth. Consequently, the motor shaft 66a is arranged in parallel to and closer to the screw mechanism 68A, 68B, compared to the case where the worm and the worm wheel are applied. Further, the number of applied components for the motion converting drive mechanism 64A, 64B is reduced and the motion converting drive mechanism 64A, 64B having a compact and simple structure is realized. In addition, since the second pinion 72 having two to four helical gear teeth is applied, a large gear ratio between the first pinion 72 and the second pinion 73, 91 is obtained and a large gear reduction ratio equal to the gear reduction ratio between the worm and the worm wheel is realized.

According to the motion converting drive mechanism 64A of the first embodiment, the screw mechanism 68A includes the internal threaded portion formed coaxially with the second pinion 73 and the lead screw 74 on which the external threaded portion meshing with the internal threaded portion is formed. Further, the lead screw 74 is arranged in a condition where the projected area of the lead screw 74 seen from the axial direction of the motor shaft 66a of the motor 66 overlaps the projected area of the motor 66. Moreover, the lead screw 74 is prevented from contacting the motor 66 when the end of the lead screw 74 is moved to a position closest to the motor 66 in the axial direction according to the linear reciprocating.

Accordingly, the motor shaft 66a and the lead screw 74 are arranged in parallel and close to each other in such a way that the projected area of the lead screw 74 is included in the projected area of the motor housing 70 of the motor 66 that is seen from the axial direction of the motor shaft 66a. That is, the motor 66, the reduction gear mechanism 67A, and the screw mechanism 68A are arranged in the approximate I-shape. Consequently, the projected area of the motion converting drive mechanism 64A seen from the axial direction is reduced, compared to the case where the worm and the worm wheel are applied, thereby realizing the compact motion converting drive mechanism 64A and increasing its installability to the seat apparatus 10. Furthermore, the motion converting drive mechanism 64A is arranged so that the lead screw 74 does not contact the motor 66 when the lead screw 74 axially reciprocates. Thus, the compact motion converting drive mechanism 64A surely converting a rotary motion of the motor 66 to a linear motion and transmitting the linear motion is realized.

According to the motion converting drive mechanism 64B of the second embodiment, the screw mechanism 68B includes the lead screw 92 on which the external threaded portion is formed and the lead nut 93 on which the internal threaded portion 93a meshing with the external threaded portion of the lead screw 92 is formed. Further, the external threaded portion is arranged coaxially with the rotation axis of the second pinion 91 and extends from the second pinion 91. The lead nut 93 moves in the axial direction of the lead screw 92 relative to the rotation of the lead screw 92. Moreover, the projected area of the lead screw 92 seen from the axial direction of the output shaft 66a of the motor 66 overlaps the projected area of the motor 66.

According to the first and second embodiments, the motion converting drive mechanism 64A, 64B is adapted to the seat apparatus 10, which includes the seat cushion 1 adapted to be fixed to the vehicle floor, the side frame 3 having the end supported by the end of the seat cushion frame 7 arranged in the seat cushion 1 so as to be tiltable relative to the seat cushion frame 7. The seat apparatus 10 further includes the upper cross-member 4 arranged at an upper side of the side frame 3 and the seat back 2 including the seat back tilting mechanism 5. The seat back tilting mechanism 5 connects the side frame 3 and the upper cross-member 4 so as that the upper cross-member 4 is tiltable relative to the side frame 3. The motion converting drive mechanism 64A, 65B is fixed to the inner side of the side frame 3 in parallel thereto and drives the seat back tilting mechanism 5.

Accordingly, even when the motion converting drive mechanism 64A, 64B is arranged at the inner side of the side frame 3 in parallel to thereto, the motion converting drive mechanism 64A, 64B does not project toward the center direction or the rearward direction of the side frame 3. Consequently, an occupant does not contact the motion converting drive mechanism 64A, 64B. Further, the thickness of the seat back 2 is reduced, thereby increasing the layout design flexibility in the internal space of the vehicle.

According to the first and second embodiments, the seat back tilting mechanism 5 forms the non-parallel four-link mechanism including the side frame 3 and the upper cross-member 4 and positioning the side frame 3 and the upper cross-member 4 to face each other.

Accordingly, the non-parallelogram-shaped four-link mechanism positioning the side frame 3 and the upper cross-member 4 to face each other is applied as the seat back tilting mechanism 5, thereby so that the rotation center of the forward tilting movement of the upper seat back portion 22 of the seat back 2 is located at a position further forward than the outer surface of the seat back 2. Consequently, a trajectory drawn when the upper cross-member 4 is tilted forward may be close to a trajectory drawn when an occupant leans forward, thereby reducing displacement between the back of the occupant and the outer surface of the seat back 2. Thus, discomfort the occupant may experience when the seat back 2 is tiled decreases. In addition, the connection between the side frame 3 and the upper cross-member 4 is reinforced by applying the link mechanism.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A motion converting drive mechanism that converts a rotary motion into a linear reciprocating motion, comprising:
a motor having an output shaft;
a housing case in which the output shaft of the motor is rotatably mounted;
a reduction gear mechanism including
a first pinion that is a gear wheel having two to four teeth, that is rotatably supported by the housing case therein, and that includes a shaft that is connected to the output shaft of the motor such that an axis of rotation of the first pinion is coaxial with an axis of rotation of the motor,
a second pinion that meshes with the first pinion, and that is rotatably supported by the housing case therein such that an axis of rotation of the second pinion is parallel to the axis of rotation of the first pinion; and
a screw mechanism having an internal threaded portion and a lead screw with an external threaded portion, one of the internal threaded portion and the external threaded portion being integrally and coaxially formed with the second pinion and including an axis of rotation that is parallel to the axis of rotation of the motor, the other of the internal threaded portion and the external threaded portion being configured to linearly and axially reciprocate in synchronization with rotation of the one of the internal threaded portion and the external threaded portion, the other of the internal threaded portion and the external threaded portion remaining parallel to the axis of rotation of the motor throughout an entire range of motion of the other of the internal threaded portion and the external threaded portion; wherein the lead screw is arranged in a condition where a projected area of the lead screw overlaps a projected area of the motor in a direction parallel to the axis of rotation of the motor.

2. The motion converting drive mechanism according to claim 1, wherein the screw mechanism includes the internal threaded portion formed coaxially with the second pinion and the lead screw on which the external threaded portion meshes with the internal threaded portion, and the lead screw is prevented from contacting the motor when an end of the lead screw is moved to a position closest to the motor in the axial direction according to the linear reciprocating motion.

3. The motion converting drive mechanism according to claim 1, wherein the screw mechanism includes the lead screw on which an external threaded portion is formed and an output member on which an internal threaded portion meshing with the external threaded portion of the lead screw is formed, the external threaded portion arranged coaxially with the rotation axis of the second pinion and extending from the second pinion, and the output member moving in an axial direction of the lead screw relative to rotation of the lead screw.

4. The motion converting drive mechanism according to claim 1, wherein the motion converting drive mechanism is adapted to a seat apparatus for a vehicle, which includes a seat cushion adapted to be fixed to a vehicle floor, a side frame having an end supported by an end of a seat cushion frame arranged in the seat cushion, the side frame being tiltable relative to the seat cushion frame, an upper cross-member arranged at an upper side of the side frame, and a seat back including a seat back tilting mechanism connecting the side frame and the upper cross-member so that the upper cross-member is tiltable relative to the side frame, and wherein the motion converting drive mechanism is fixed to an inner side of the side frame in parallel thereto and drives the seat back tilting mechanism.

5. The motion converting drive mechanism according to claim 2, wherein the motion converting drive mechanism is adapted to a seat apparatus for a vehicle, which includes a seat cushion adapted to be fixed to a vehicle floor, a side frame having an end supported by an end of a seat cushion frame arranged in the seat cushion, the side frame being tiltable relative to the seat cushion frame, an upper cross-member arranged at an upper side of the side frame, and a seat back including a seat back tilting mechanism connecting the side frame and the upper cross-member so that the upper cross-member is tiltable relative to the side frame, and wherein the motion converting drive mechanism is fixed to an inner side of the side frame in parallel thereto and drives the seat back tilting mechanism.

6. The motion converting drive mechanism according to claim 3, wherein the motion converting drive mechanism is adapted to a seat apparatus for a vehicle, which includes a seat cushion adapted to be fixed to a vehicle floor, a side frame having an end supported by an end of a seat cushion frame arranged in the seat cushion, the side frame being tiltable relative to the seat cushion frame, an upper cross-member arranged at an upper side of the side frame, and a seat back including a seat back tilting mechanism connecting the side frame and the upper cross-member so that the upper cross-member is tiltable relative to the side frame, and wherein the motion converting drive mechanism is fixed to an inner side of the side frame in parallel thereto and drives the seat back tilting mechanism.

7. The motion converting drive mechanism according to claim 4, wherein the seat back tilting mechanism forms a non-parallel four-link mechanism including the side frame and the upper cross-member configured to position the side frame and the upper cross-member to face each other.

8. The motion converting drive mechanism according to claim 5, wherein the seat back tilting mechanism forms a non-parallel four-link mechanism including the side frame and the upper cross-member configured to position the side frame and the upper cross-member to face each other.

9. The motion converting drive mechanism according to claim 6, wherein the seat back tilting mechanism forms a non-parallel four-link mechanism including the side frame and the upper cross-member configured to position the side frame and the upper cross-member to face each other.

10. The motion converting drive mechanism according to claim 1, wherein the axis of rotation overlaps a projected area of the motor in a direction parallel to the axis of rotation of the motor.

11. The motion converting drive mechanism according to claim 1, wherein the housing case accommodates the reduction gear mechanism and the screw mechanism therein, and the housing case is integrally connected to a motor housing.

12. A seat apparatus for a vehicle, comprising:
a seat cushion; and
a seat back,
the seat back provided with a side frame, a motor having an output shaft, an upper-cross member, a seat back tilting mechanism, and a motion converting drive mechanism,
the side frame having an end supported by an end of a seat cushion frame arranged in the seat cushion, the side frame being tiltable relative to the seat cushion frame,
the upper-cross member arranged at an upper side of the side frame, the seat back tilting mechanism connecting the side frame and the upper cross-member so that the upper cross-member is tiltable relative to the side frame, the motion converting drive mechanism including a housing case in which the output shaft of the motor is rotatably mounted, a reduction gear mechanism including a first pinion that is a gear wheel having two to four teeth, that is rotatably supported by the housing case therein, and that includes a shaft that is connected to the output shaft of the motor such that an axis of rotation of the first pinion is coaxial with an axis of rotation of the motor, and a second pinion that meshes with the first pinion, and that is rotatably supported by the housing case therein such that an axis of rotation of the second pinion is parallel to the axis of rotation of the first pinion; and a screw mechanism having an internal threaded portion and a lead screw with an external threaded portion, one of the internal threaded portion and the external threaded portion being integrally and coaxially formed with the second pinion and including an axis of rotation that is parallel to the axis of rotation of the motor, the other of the internal threaded portion and the external threaded portion being configured to linearly and axially reciprocate in synchronization with rotation of the one of the internal threaded portion and the external threaded portion, the other of the internal threaded portion and the external threaded portion remaining parallel to the axis of rotation of the motor throughout an entire range of motion of the other of the internal threaded portion and the external threaded portion;

wherein the lead screw is arranged in a condition where a projected area of the lead screw overlaps a projected area of the motor in a direction parallel to the axis of rotation of the motor.

13. The seat apparatus according to claim 12, wherein the screw mechanism includes the internal threaded portion formed coaxially with the second pinion and the lead screw on which the external threaded portion meshes with the internal threaded portion, and the lead screw is prevented from contacting the motor when an end of the lead screw is moved to a position closest to the motor in the axial direction according to the linear reciprocating motion.

14. The seat apparatus according to claim 12, wherein the screw mechanism includes the lead screw on which an external threaded portion is formed and an output member on which an internal threaded portion meshing with the external threaded portion of the lead screw is formed, the external threaded portion arranged coaxially with the rotation axis of the second pinion and extending from the second pinion, and the output member moving in an axial direction of the lead screw relative to rotation of the lead screw.

15. The seat apparatus according to claim 12, wherein the seat back tilting mechanism forms a non-parallel four-link mechanism including the side frame and the upper cross-member configured to position the side frame and the upper cross-member to face each other.

16. The seat apparatus according to claim 13, wherein the seat back tilting mechanism forms a non-parallel four-link mechanism including the side frame and the upper cross-member configured to position the side frame and the upper cross-member to face each other.

17. The seat apparatus according to claim 14, wherein the seat back tilting mechanism forms a non-parallel four-link mechanism including the side frame and the upper cross-member configured to position the side frame and the upper cross-member to face each other.

18. The seat apparatus according to claim 12, wherein the axis of rotation overlaps a projected area of the motor in a direction parallel to the axis of rotation of the motor.

19. The seat apparatus according to claim 12, wherein the housing case accommodates the reduction gear mechanism and the screw mechanism therein, and the housing case is integrally connected to a motor housing.

* * * * *